United States Patent [19]

Nelson et al.

[11] 4,318,334
[45] Mar. 9, 1982

[54] TORQUE CONTROL FOR A FLUID OPERATED MOTOR

[75] Inventors: Dana W. Nelson, Bellville; Charles H. Kouse, Springfield, both of Ohio

[73] Assignee: Carrier Corporation, Syracuse, N.Y.

[21] Appl. No.: 132,067

[22] Filed: Mar. 20, 1980

[51] Int. Cl.³ .......................................... B25B 23/14
[52] U.S. Cl. ................................. 91/59; 91/358 R; 91/364; 173/8
[58] Field of Search ............... 91/59, 358, 381, 382, 91/364; 173/8

[56] References Cited

U.S. PATENT DOCUMENTS

| | | |
|---|---|---|
| 1,815,345 | 7/1931 | Colman . |
| 2,784,703 | 3/1951 | Davis ................................ 91/381 |
| 3,612,236 | 10/1971 | Fernstrom ....................... 91/59 X |
| 3,766,990 | 10/1973 | Eckman . |
| 3,767,320 | 10/1973 | Theis . |

FOREIGN PATENT DOCUMENTS 280878 12/1967 U.S.S.R. ............................. 173/8

*Primary Examiner*—Alan Cohan
*Attorney, Agent, or Firm*—J. Raymond Curtin; Donald F. Daley

[57] ABSTRACT

A torque control for a fluid operated motor includes a first gear to be driven through operation of the motor and a second gear in driving engagement with said motor and maintained in a generally stationary position during normal operation thereof. The torque control further includes a drive mechanism connected to the first gear and to a load to be rotationally driven through operation of the motor. A valve is provided in the fluid supply to the motor to open and close the supply of fluid thereto. Disconnect means is operatively connected to the second gear and the valve to maintain said valve in an open position to permit supply of fluid to said motor when the second gear is stationary. The second gear rotates when the torque required from the motor to rotate the load exceeds a predetermined magnitude to move the disconnect means relative to the valve to close the valve to terminate the supply of fluid to the motor.

12 Claims, 5 Drawing Figures

TORQUE CONTROL FOR A FLUID OPERATED MOTOR

BACKGROUND OF THE INVENTION

This invention relates to a torque control for a fluid operated motor, and in particular, to a torque control operable to terminate the supply of fluid to the motor when the torque produced by the motor exceeds a predetermined level.

Fluid operated motors, such as air motors, are used to drive many devices such as wrenches, drilling equipment, screw drivers, tube expanders etc. In so driving such equipment, it is desirable to accurately limit the maximum torque supplied from the motor to the various devices to prevent damage to a work piece, or to the device. Further, it is desirable to immediately terminate the flow of fluid to the motor when the maximum torque is reached to insure that such maximum torque is not exceeded through inadvertent continued operation of the motor.

Heretofore, numerous mechanisms have been devised to accomplish the foregoing. However, most of the devices heretofore used employ either a friction device, or spring means to limit the maximum torque developed from a motor, or use various types of clutch mechanisms to disconnect the load from the motor when a predetermined maximum torque is obtained. Due to wear and rough handling, these devices are not accurate enough or do not remain accurate enough for fine tolerance work. Further, particularly in the instances wherein clutches are employed to disconnect the work from the motor, the clutches tend to wear quickly, thus increasing the maintenance cost involved in operating such motors.

SUMMARY OF THE INVENTION

Accordingly, it is an object of this invention to improve torque controls for a fluid operated motor.

It is a further object of this invention to directly sense the torque produced by a motor to drive a work load and to terminate flow of fluid to such motor when a predetermined torque has been reached.

It is a further object of this invention to eliminate the use of a clutch in a torque control for a fluid operated motor.

These and other objects of the present invention are attained in a torque control for controlling the supply of a motivating fluid to a fluid operated motor including gear means having a first gear driven through operation of said motor and a second gear in driving engagement with said motor and maintained in a generally stationary position during normal operation thereof. Drive means is connected to the first gear and to the load to be rotationally driven through operation of said motor. Valve means is provided in the fluid supply to the motor to open and close the supply of fluid thereto. Disconnect means is operatively connected to the second gear and the valve means to maintain the valve means in an open position to permit supply of fluid to the motor when the second gear is stationary. The second gear is rotated when the torque required from the motor to rotate the load exceeds a predetermined magnitude to move the disconnect means relative to the valve means to close the valve means to terminate the supply of fluid to said motor.

DESCRIPTION OF THE PREFERRED EMBODIMENT

Figure 1:
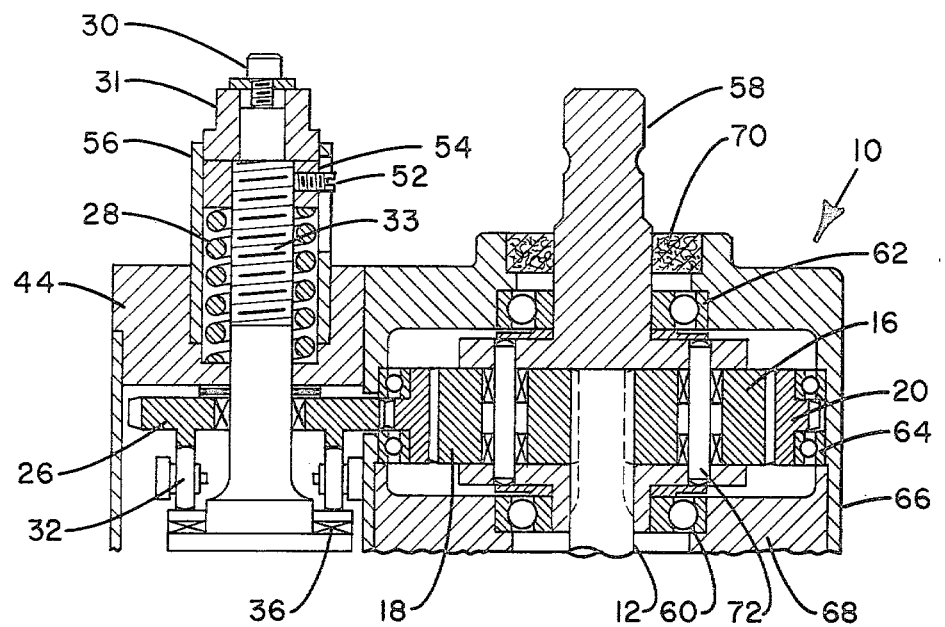
FIG. 1 is a partial sectional view of a fluid operated motor including the torque control of the present invention.

Referring now to the drawings, there is disclosed a preferred embodiment of the present invention. In referring to the various figures of the drawing, like numerals shall refer to like parts.

Figure 3:
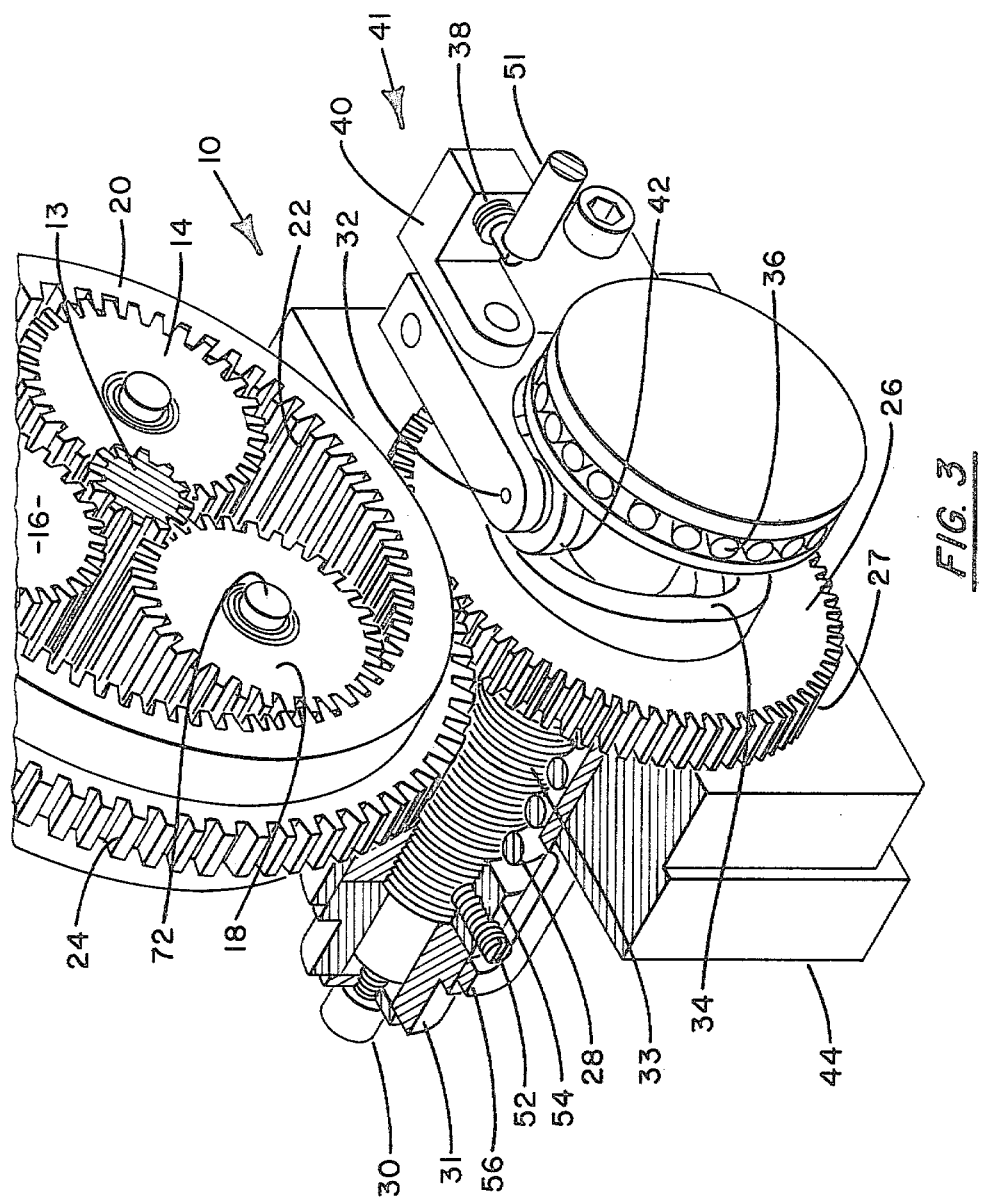
FIG. 3 is an additional perspective view, partially in section, showing further details of the torque control of the present invention.

Reference numeral 10 generally refers to the torque control device of the present invention. As previously indicated, torque control device 10 is designed for use with fluid operated motors such as an air motor. Although not specifically shown, the air motor may be of conventional design such as a rotary vane motor. The motor is connected to drive shaft 12. As is obvious, rotation of the motor will cause simultaneous rotation of the shaft. Shaft 12 includes an integral gear 13 (shown in FIG. 3) connected to a group of planetary gears, respectively gears 14, 16 and 18. A ring gear 20 surrounds planetary gears 14, 16 and 18. Ring gear 20 includes internal gear teeth 22 and external gear teeth 24. Preferably, internal gear teeth 22 are in intermeshing relationship with the gear teeth of the planetary gears. As shall be more fully explained hereinafter, ring gear 20 is maintained stationary during normal operation of the motor. With ring gear 20 stationary, the planetary gears will orbit about the inside surface of the ring gear during normal operation of the motor. A gear cover 66 surrounds the ring and planetary gears and is connected to a bearing support member 68. Bearing support member 68 and gear cover 66 provide a support for rotating bearings 60, 62 and 64.

A spider or torque transmission member 58 is connected by means, such as pins 72 to the planetary gears for rotation therewith. Torque transmitting member 58 transmits the torque from the motor, through the planetary gears, to a work load connected to the torque transmitting member. A seal 70 is provided to prevent foreign material from reaching the gears.

External gear teeth 24 of ring gear 20 are in intermeshing relationship with gear teeth 27 of cam member 26. Cam member 26 is supported for rotation within cam support block 44. Cam member 26 is disposed about adjusting screw 33, Adjusting screw 33 is mounted within a housing 56 and is held in a stationary position via set screw 52.

An adjusting nut 54 is positioned on adjusting screw 33 and provides an adjustable compressive force on spring 28. Spring 28 provides an anti-rotational force for preventing free rotation of cam member 26 for a reason to be more fully explained hereinafter. Set screw 52 also maintains adjusting nut 54 in a fixed position on screw 33 once the compressive force on spring 28 has been established. The compressive force provided by nut 54 on spring 28 determines the anti-rotational force generated by the spring. An adjusting knob 31 is used to manually move adjusting nut 54 along screw 33. A cap screw 30, fixed within the end of screw 33, maintains adjusting knob 31 on the adjusting screw. Screw 33 has a thrust bearing 36 connected to one end thereof.

Figure 4:
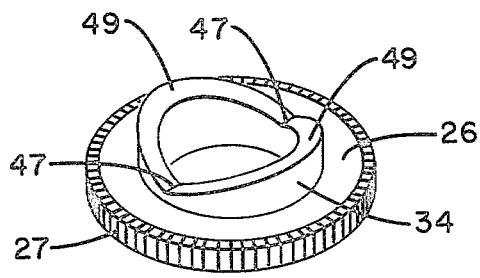
FIG. 4 is a perspective veiw looking down on the cam surface, previously shown in FIGS. 2 and 3.

Cam member 26 has a cam surface 34 provided about one face thereof. Cam surface 34 preferably includes a pair of V-shaped grooves 47 particularly shown in FIG. 4. The V-shaped grooves are defined between inclined surfaces 49.

Cam followeres 42 and 46 are normally positioned within grooves 47 during normal operation of the air motor. The compressive force developed by spring 28 is transmitted via nut 54, set screw 52, screw 33 and thrust bearing 36 to the cam followers to maintain the followers within the grooves formed in cam surface 34. The cam followers are connected to a trip arm assembly generally designated by reference numeral 41.

Figure 5:
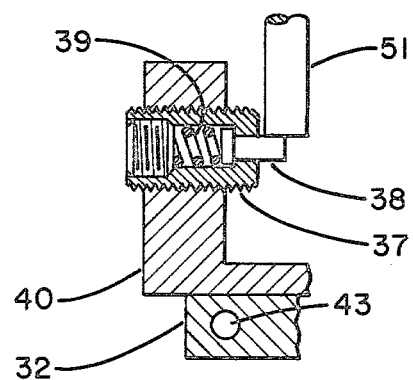
FIG. 5 is a sectional view of the trip arm assembly taken along lines V-V of FIG. 2.
Figure 2:
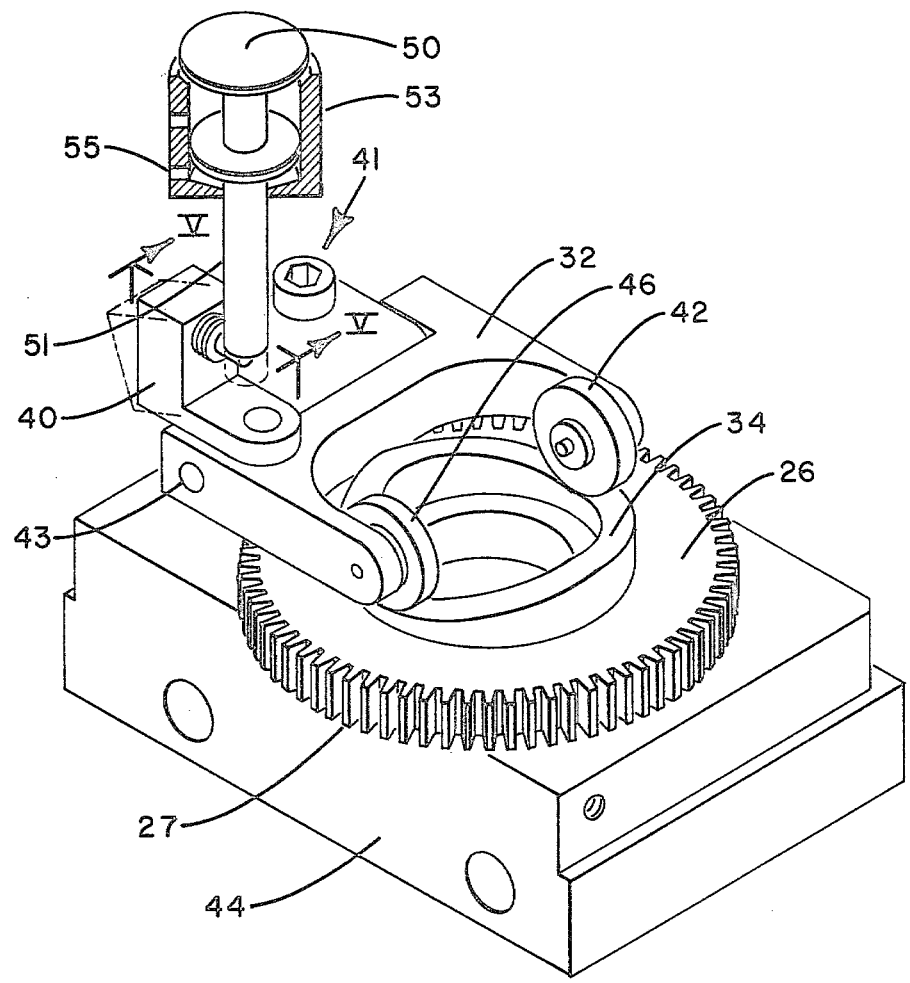
FIG. 2 is a perspective view, partially in section, of a portion of the torque control of the present invention.

Specifically, cam followers 42 And 46 are connected to a cam follower bracket 32. Bracket 32 has a trip arm bracket 40 mounted thereon by suitable means such as set screws or the like. Trip arm bracket 40 includes a trip pin 38 extending therefrom. As shown in FIGS. 2 and 5, cam follower bracket 32 is designed to pivot about a pivot pin 43 as cam followers 42 and 46 move relative to cam surface 34. In effect, as the cam followers move from grooves 47 along inclined surfaces 49, bracket 32 pivots about pin 43. The pivoting action of cam follower bracket 32 will in turn cause trip arm bracket 40 and trip pin 38 to also rotate about pivot pin 43. In FIG. 2, the solid line representation illustrates the trip arm bracket in position during normal operation of the motor, whereas the dotted line representation of the bracket illustrates the bracket when a torsional load exceeding a predetermined magnitude has been generated by the motor.

Valve stem 51 of valve 50 is supported by trip pin 38 during normal operation of the fluid motor. Valve 50 controls the admission of the motivating fluid, for example air, to the motor. During normal operation, the valve is in an open position allowing the motivating fluid to flow freely to the motor for operation thereof. As shall be more fully explained hereinafter, trip pin 38 pivots relative to valve stem 51, causing the valve stem and valve to move to a closed position to terminate the flow of the motivating fluid to the motor.

During normal operation of the motor, with valve 50 in its open position, the motivating fluid is supplied to the motor resulting in rotation of rotor shaft 12 and thus gear 13 provided thereon. Rotation of gear 13 will cause planetary gears 14, 16 and 18 to rotate relative to ring gear 20. The external teeth of ring gear 20, as noted previously, are in intermeshing relationship with gear teeth 27 of cam member 26. Spring 28 prevents the cam member from freely rotating. Cam member 26 only rotates when a torsional force above a predetermined magnitude is transmitted via ring gear 20 to overcome the anti-rotational force generated by spring 28. Until such torsional force is generated by the motor and transmitted by the ring gear, spring 28 prevents cam member 26 and thus ring gear 20 from rotating even though the motor is operational. In effect, the spring maintains cam followers 42, 46 in grooves 47 to prevent the cam from rotating. As noted previously, during normal operation of the motor planetary gears 14, 16 and 18 transmit the motor torque to spider or torque transmitting means 58. The work load driven by the motor, as for example an air operated wrench or screw driver, is connected to spider 58.

When the work load driven through the spider increases, as for example when a wrench is utilized to tighten nuts, the torque generated by the motor to overcome the increased anti-rotational force developed by the work load also increases. The increased motor torque is transmitted by the planetary gears to ring gear 20. When the torque generated by the motor exceeds a predetermined level the torque transmitted by ring gear 20 will overcome the anti-rotational force developed by spring 28, allowing both gear 20 and cam member 26 to rotate.

The rotation of cam member 26 relative to cam followers 42 and 46, moves the followers from grooves 47 along inclined surface 49. Such movement will cause cam follower bracket 32 to pivot about pin 43 resulting in simultaneous pivoting action of trip arm bracket 40 and thus trip pin 38. The movement of pin 38 relative to stem 51 eliminates the pin as a support for the stem, causing valve 50 to move into a closed position. With the valve moved to its closed position, the supply of fluid to the motor is terminated.

When it is desired to reactuate the motor, the valve is returned to its open position. Valve housing 3 includes port 55 for enabling fluid to be admitted on the underside of valve 50 for raising the valve to its open position. Assuming the motor is no longer generating the excessive torque, spring 28 returns cam member 26 to its initial position, whereat cam followers 42, 46 are retained in grooves 47. As the bracket 40 rotates clockwise as seen in FIG. 5, the pin 38 will contact valve stem 51. Pin 38 is mounted for sliding movement in a pin support guide 37 and is biased outwardly by a spring 39. When the pin 38 engages the stem 51 it is moved inwardly against the action of spring 39. When stem 51 is elevated pin 38 snaps out of guide 37 and provides support for the stem.

The foregoing arrangement provides a torque sensitive device for a fluid operated motor which quickly and effectively terminates the flow of fluid to the motor when the torque generated by the motor exceeds a predetermined magnitude. The arrangement effectively terminates the flow of fluid to the motor without utilizing clutches or similar relatively rapid wearing mechanisms.

While a preferred embodiment of the invention has been described and illustrated, the invention should not be limited thereto but may be otherwise embodied within the scope of the following claims.

We claim:

1. A torque control for a fluid operated motor comprising:

gear means including at least one planetary gear connected to said motor for rotation therewith, and a ring gear in engagement with said planetary gear and maintained in a generally stationary position during normal operation of said motor, with said planetary gear orbiting about said ring gear when the ring gear is stationary and said motor is operating;

torque transmitting means connecting said orbiting planetary gear and work load, with the torque transmitted from said motor through said planetary gear to said work load increasing as the work load increases;

cam means in driving engagement with said ring gear, with said ring gear rotating to rotate said cam means when the torque transmitted from the motor to said work load increases above a predetermined magnitude; and valve means connected to said cam means for controlling the flow of fluid to said motor and movable from an open to a closed position to terminate flow of motivating fluid to said motor upon rotation of said cam means.

2. A torque control in accordance with claim 1 wherein said cam means includes a cam and a cam follower, with said cam having a generally V-shaped groove in which the cam follower is maintained during normal operation of said motor, said cam moving relative to said cam follower upon rotation of said ring gear.

3. A torque control in accordance with claim 2 wherein said cam means further includes a trip pin connected to said cam follower for maintaining said valve means in its open position when the cam follower rests in the V-shaped groove of said cam, said trip pin pivoting relative to said valve means upon relative rotation between said cam and said cam follower to place said valve means in its closed position.

4. A torque control in accordance with claim 3 including spring means providing a force to maintain said ring gear in its stationary position.

5. A torque control in accordance with claim 4 further including adjustment means for varying the force produced by said spring means.

6. A torque control for controlling the supply of a motivating fluid to a fluid operated motor comprising:
gear means including a first gear to be driven through operation of said motor and a second gear in driving engagement with said motor and maintained in a generally stationary position during normal operation thereof;
drive means connected to said first gear and to a load to be rotationally driven through operation of said motor;
valve means in the fluid supply to said motor to open and close the supply of fluid thereto; and
disconnect means operatively connected to said second gear and said valve means for maintaining said valve means in an open position to permit supply of fluid to said motor when said second gear is stationary, said second gear rotating when the torque required from said motor to rotate said load exceeds a predetermined magnitude to move said disconnect means relative to said valve means to close the supply of fluid to said motor.

7. A torque control in accordance with claim 6 wherein said disconnect means includes a cam operably connected to said second gear and a cam follower in engagement with said valve means for maintaining the valve means in its open position, movement of said second gear moving said cam follower relative to said valve means to place said valve means in its closed position.

8. A torque control in accordance with claim 7 wherein said first gear includes a planetary gear, and said second gear is a ring gear, with said planetary gear orbiting about said ring gear during normal operation of said motor.

9. A torque control in accordance with claim 8 including spring means for providing a force to maintain said cam and said second gear stationary during normal operation of said motor.

10. A torque control in accordance with claim 9 including adjustment means connected to said spring means for varying the force produced by said spring means.

11. A torque control for controlling the supply of a motivating fluid to a fluid operated motor comprising:
gear means including a first gear to be driven through operation of said motor and a second gear in driving engagement with said motor and maintained in a generally stationary position during normal operation thereof;
drive means connected to said first gear and to a load to be rotationally driven through operation of said motor;
valve means in the fluid supply to said motor to open and close the supply of fluid thereto;
cam means including a cam operably connected to said second gear and a cam follower in engagement with said valve means; and
force producing means for maintaining said cam follower in a fixed position relative to said cam during normal operation of said motor, said second gear rotating when the torque required from said motor to rotate said load exceeds a predetermined magnitude to move said cam relative to said cam follower and said cam follower relative to said valve means to close the supply of fluid to said motor.

12. A torque control in accordance with claim 11 wherein said force producing means includes:
a compression spring;
an adjusting screw maintained in a fixed position relative to said cam means and having a thrust bearing provided at one end in engagement with said cam follower; and
force transmitting means for transmitting the force generated by said compression spring through said thrust bearing to said cam follower for maintaining said cam follower in the fixed position relative to said cam.

* * * * *